(12) United States Patent
Baraille et al.

(10) Patent No.: US 9,962,029 B2
(45) Date of Patent: May 8, 2018

(54) MODULAR COOKING SYSTEM AND A METHOD RELATING TO SAID SYSTEM

(71) Applicant: SEB S.A., Ecully (FR)

(72) Inventors: Laurent Eric Baraille, Fontaine les Dijon (FR); Nicolas Decroze, Lyons (FR)

(73) Assignee: SEB S.A., Ecully (FR)

( * ) Notice: Subject to any disclaimer, the term of this patent is extended or adjusted under 35 U.S.C. 154(b) by 208 days.

(21) Appl. No.: 14/590,777

(22) Filed: Jan. 6, 2015

(65) Prior Publication Data

US 2015/0190008 A1  Jul. 9, 2015

(30) Foreign Application Priority Data

Jan. 7, 2014 (FR) ..................................... 14 50103

(51) Int. Cl.
*A47J 27/08* (2006.01)

(52) U.S. Cl.
CPC ................................ *A47J 27/0802* (2013.01)

(58) Field of Classification Search
CPC .................................................. A47J 27/0802
USPC .............. 99/331, 25, 342; 219/432; 426/523
See application file for complete search history.

(56) References Cited

U.S. PATENT DOCUMENTS

| | | | |
|---|---|---|---|
| 7,669,521 B2* | 3/2010 | Cartigny | A47J 27/0813 99/337 |
| 8,544,381 B2* | 10/2013 | Cartigny | A47J 27/0813 219/440 |
| 8,648,282 B2* | 2/2014 | Garcia | A47J 27/004 219/432 |
| 2005/0028678 A1* | 2/2005 | Baraille | A47J 27/0802 99/331 |
| 2012/0012010 A1* | 1/2012 | Baraille | A47J 27/09 99/325 |
| 2012/0040067 A1* | 2/2012 | Baraille | A47J 27/0802 426/523 |
| 2013/0249698 A1 | 9/2013 | Fissler | |

FOREIGN PATENT DOCUMENTS

| | | |
|---|---|---|
| EP | 2002765 A1 | 12/2008 |
| WO | WO2013064348 A1 | 5/2013 |

* cited by examiner

*Primary Examiner* — Tu B Hoang
*Assistant Examiner* — Vy Nguyen
(74) *Attorney, Agent, or Firm* — Loeb & Loeb LLP

(57) ABSTRACT

The invention provides a cooking system that includes a pressure cooker provided with a regulator valve designed to maintain the pressure at a setpoint value, a telecommunications module, and a timer module, the pressure cooker, the telecommunications module, and the timer module being provided with complementary fastener means making it possible to fasten the telecommunications module and the timer module to the pressure cooker as alternatives and in a removable manner.

19 Claims, 3 Drawing Sheets

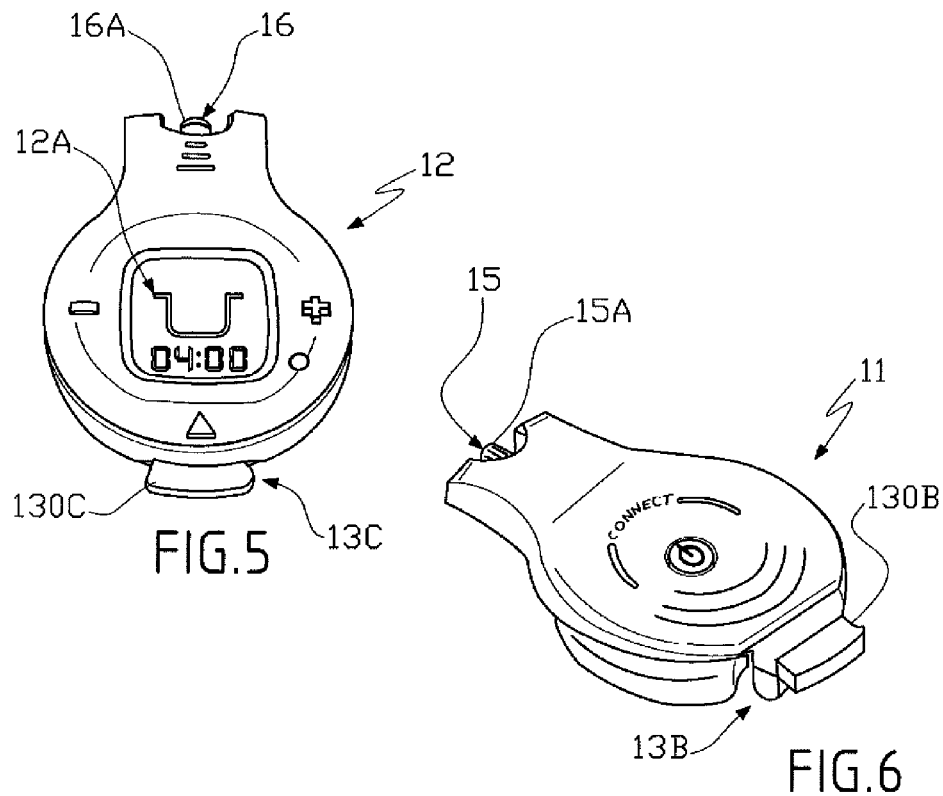
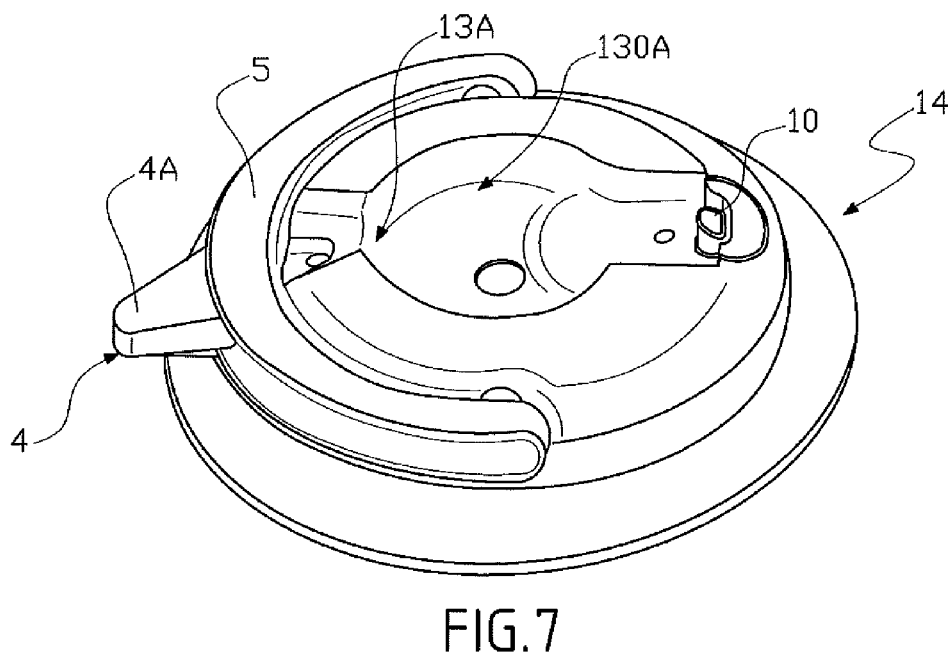

MODULAR COOKING SYSTEM AND A METHOD RELATING TO SAID SYSTEM

This application claims priority from French Application No. FR-14 50103 filed on Jan. 7, 2014, entitled, "A modular cooking system and a method relating to said system."

BACKGROUND

The present invention relates to the general technical field of cooking utensils of the cooking pot type, and in particular to the sector of pressure cookers, i.e. pressure-cookers that serve to cook the food they contain under steam pressure.

The present invention relates more particularly to a household food-cooking system comprising a pressure cooker provided with a pressure regulator valve designed to maintain the pressure prevailing in the pressure cooker substantially at a setpoint value.

The present invention also relates to a telecommunications module.

The present invention also relates to a household method of cooking food by means of a pressure cooker provided with a pressure regulator valve designed to maintain the pressure prevailing in the pressure cooker substantially at a setpoint value.

Household pressure cookers are well known. Such a pressure cooker is usually made up of a metal vessel serving to receive the food, and of a lid that is also made of metal, and that serves to be mounted and locked on the vessel so that the lid co-operates with the vessel to form a sealed cooking enclosure. Such a pressure cooker serves to be subjected to the influence of a heat source (such as, for example, a hotplate) in such a manner as to enable pressure and temperature to build up inside the enclosure and thus as to enable the food contained in said enclosure to be cooked under pressure.

Operation of such known pressure cookers is governed by various different members, such as, for example:
- locking/unlocking means capable of locking and unlocking the lid relative to the vessel;
- a pressure regulator valve making it possible to maintain the pressure in the enclosure at a predetermined setpoint level or "operating pressure" (which is optionally adjustable if the valve is a calibrated valve having adjustable calibration);
- or indeed a decompression member, enabling the pressure inside the enclosure to be caused to drop, in particular at the end of the cooking process, so that the user can open the lid under acceptable safety conditions.

Each of these functions can be controlled by the user by means of one or more corresponding control means serving to be actuated manually by the user.

In particular, a pressure-cooking utensil is known that is equipped with a control knob enabling the user to have manual control over decompressing the cooking enclosure, and over adjusting the calibration of the regulator valve as a function, in particular, of the type of food to be cooked. In such a known pressure cooker, the control knob in question is thus mounted to move between five positions, namely:
- a first position corresponding to triggering decompression of the cooking enclosure;
- a second position corresponding to a first setpoint pressure level, adapted to cooking vegetables;
- a third position corresponding to a second setpoint pressure level, adapted to cooking starchy food;
- a fourth position corresponding to a third setpoint pressure level, adapted to cooking meat; and
- a fifth position corresponding to a fourth setpoint pressure level, particularly adapted to cooking fish.

In addition to the control knob, control means are provided for controlling locking/unlocking of the lid relative to the vessel, and a programmable timer is provided, triggering of which is controlled by a temperature sensor.

In view of the above, such a pressure cooker can, initially, appear to be relative complex, daunting, and/or stressful to use for a normally informed user, who wishes to use such a pressure cooker in a household context.

The relative complexity of controlling such a pressure cooker, which, when it is used correctly, also makes it possible to obtain cooking results that are quite remarkable, both organoleptically and nutritionally, leads to a risk of the user being incapable of using the pressure cooker optimally and of making full use of all of its advantages.

In order to overcome that drawback, consideration might be given to equipping the pressure cooker with an electronic control system making it possible, e.g. by means of a display screen, to improve the ergonomics of using the pressure cooker by making the pressure cooker more intuitive to operate.

For example, consideration might be given to using an application for giving assistance with use and run on a smartphone, in view of the popularity of such phones that are possessed by very many consumers.

Such an idea, which is appealing at first sight, is, however, very difficult to implement in practice in view of the specificity of pressure cookers (which are pressurized utensils that must comply with strict safety requirements) and in view of them being consumer goods, which results in very specific constraints as regards producing them industrially and selling them.

In particular, it appears essential for the pressure cooker to be easy and entirely safe to use, while also being relatively ergonomic to use, even in the absence of a smartphone (regardless of the reason for such absence, which can, in particular, result from it being unavailable due to its battery not being charged, for example).

Objects assigned to the invention are therefore to solve the problem described above while also remedying the various drawbacks listed above, and to propose, for that purpose, a novel household food-cooking system that, while being of particularly simple, upgradable, and inexpensive design, is intuitive, ergonomic, and safe to use.

Another object of the invention is to propose a novel household food-cooking system that is of simple and robust construction.

Another object of the invention is to propose a novel household food-cooking system that can be used reliably under all circumstances.

Another object of the invention is to propose a novel household food-cooking system that enables the user, in purely optional manner, to make use of particularly advanced assistance both quickly and intuitively.

Another object of the invention is to propose a novel household food-cooking system that can, in extremely simple manner, be used in two different modes of use, namely a fully stand-alone mode, and a "computer-assisted" mode.

Another object of the invention is to propose a novel household food-cooking system that is of particularly reliable and compact construction.

Another object of the invention is to propose a novel household food-cooking system that makes use of as few different parts as possible.

Another object of the invention is to propose a novel telecommunications module making it possible to improve the ergonomics and safety of use of a pressure cooker in very simple and intuitive manner.

Another object of the invention is also to propose a novel household food-cooking method that enables the user to choose extremely simply between two modes of use of a conventional pressure cooker, which modes differ by their ergonomics and by the assistance given to the user.

The objects assigned to the invention are achieved by means of a household food-cooking system comprising a pressure cooker provided with a pressure regulator valve designed to maintain the pressure prevailing in the pressure cooker substantially at a setpoint value, said system being characterized in that it further comprises an independent telecommunications module and an independent timer module, said pressure cooker, said telecommunications module, and said timer module being provided with complementary fastener means making it possible to fasten said telecommunications module and said timer module to said pressure cooker as alternatives and in removable manner, said telecommunications module being capable, when it is fastened to the pressure cooker of transmitting at least one signal relating to operation of the pressure cooker to an independent computer terminal via a wireless link, while said timer module is capable, when it is fastened to said pressure cooker, of counting down a predetermined time to be counted from the instant at which the pressure prevailing in the pressure cooker substantially reaches said setpoint value for the first time.

The objects assigned to the invention are also achieved by means of a telecommunications module characterized in that it serves to be part of a household food-cooking system that further comprises:
 a pressure cooker that is provided firstly with a pressure regulator valve designed to maintain the pressure prevailing in the pressure cooker substantially at a setpoint value, and secondly with fastener means; and
 a timer module independent from said telecommunications module, said timer module being provided with fastener means complementary to the fastener means with which the pressure cooker is provided so as to fasten said timer module removably to the pressure cooker, which timer module, when it is fastened to said pressure cooker, is capable of counting down a predetermined time to be counted from the instant at which the pressure prevailing in the pressure cooker substantially reaches said setpoint value for the first time;
said telecommunications module also being provided with fastener means that are complementary to said fastener means with which the pressure cooker is provided, so as to fasten said telecommunications module removably to said pressure cooker in place of said timer module, said telecommunications module being capable, when it is fastened to the pressure cooker, of transmitting at least one signal relating to operation of the pressure cooker to an independent computer terminal via a wireless link.

The objects assigned to the invention are also achieved by a household method of cooking food by means of a pressure cooker provided with a pressure regulator valve designed to maintain the pressure prevailing in the pressure cooker substantially at a setpoint value, said method being characterized in that it includes a step in which an independent telecommunications module and an independent timer module are, in turn, fastened removably to said pressure cooker, said telecommunications module being capable, when it is fastened to the pressure cooker, of transmitting at least one signal relating to operation of the pressure cooker to an independent computer terminal via a wireless link, while said timer module is capable, when it is fastened to said pressure cooker, of counting down a predetermined time to be counted from the instant at which the pressure prevailing in the pressure cooker substantially reaches said setpoint value for the first time.

BRIEF DESCRIPTION OF THE DRAWINGS

Other features and advantages of the invention appear and can be seen more clearly on reading the following description with reference to the accompanying drawings, given merely by way of non-limiting illustration, and in which:

FIG. 5 shows the timer module on its own;

FIG. 6 shows the telecommunications module on its own; and

FIG. 7 shows an implementation detail of the pressure cooker of the preceding figures, consisting in a one-piece subassembly serving to be united with the lid and forming a recess serving to receive equally well either the telecommunications module or the timer module as alternatives.

The invention relates to a household food-cooking system, i.e. a system for cooking food in a family context, and, in particular, it does not relate to the catering trade.

The household food-cooking system of the invention includes a pressure cooker 1 serving to cook food under steam pressure. The pressure cooker 1 is naturally, in this example, a household pressure cooker, which presupposes, in particular, that it forms a kitchen utensil that is portable (i.e. than can be moved around and carried by hand) and that is independent. Advantageously, the pressure cooker of the invention is thermally passive, i.e. it is designed to be brought up to pressure under the effect of a heat source that is external to it, such as a hotplate. It is, however, quite possible, without going beyond the ambit of the invention, for the heat source to be part of the pressure cooker 1 (as applies to electric pressure cookers).

As is well known per se, the pressure cooker 1 of the invention includes a vessel 2 forming a cooking pot and advantageously being substantially circularly symmetrical about a central vertical axis. The vessel 2 is, for example, and in conventional manner, manufactured by being die-stamped from a blank of a metal material such as aluminum or stainless steel. A heat-conductive bottom 2A may advantageously be mounted, e.g. by hot stamping, on the bottom of the pot obtained by die-stamping, in order to form a vessel 2 equipped with a heat-conductive bottom.

The pressure cooker 1 of the invention also includes a lid 3 serving to be associated with the vessel 2 so as to co-operate with said vessel to form a cooking enclosure inside which the pressure is capable of reaching a setpoint value (regulated by a regulator valve, as explained below) that is greater than atmospheric pressure. The cooking enclosure is thus substantially sealed, i.e. it is sufficiently airtight to enable pressure to build up significantly inside it, e.g. to a level (setpoint value) exceeding atmospheric pressure by a value lying in the range 4 kilopascals (kPa) to 150 kPa. The lid 3 is advantageously made of a metal material (e.g. of made of stainless steel) and is of preferably disk-shaped general shape that is complementary to the shape of the vessel 2 with which it is associated to form the cooking enclosure.

Figure 1:
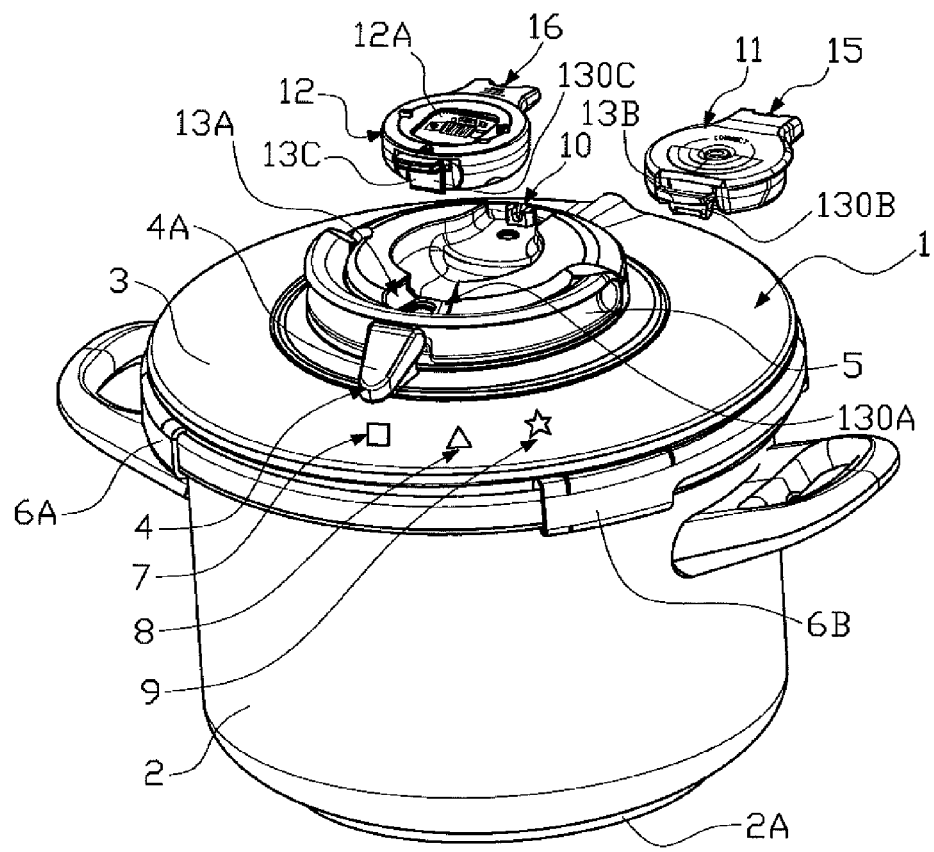
FIG. 1 is a diagrammatic perspective view showing a household food-cooking system of the invention, including firstly the pressure cooker and secondly an independent telecommunications module and an independent timer module, said modules being shown as unfastened from the pressure cooker.
Figure 2:
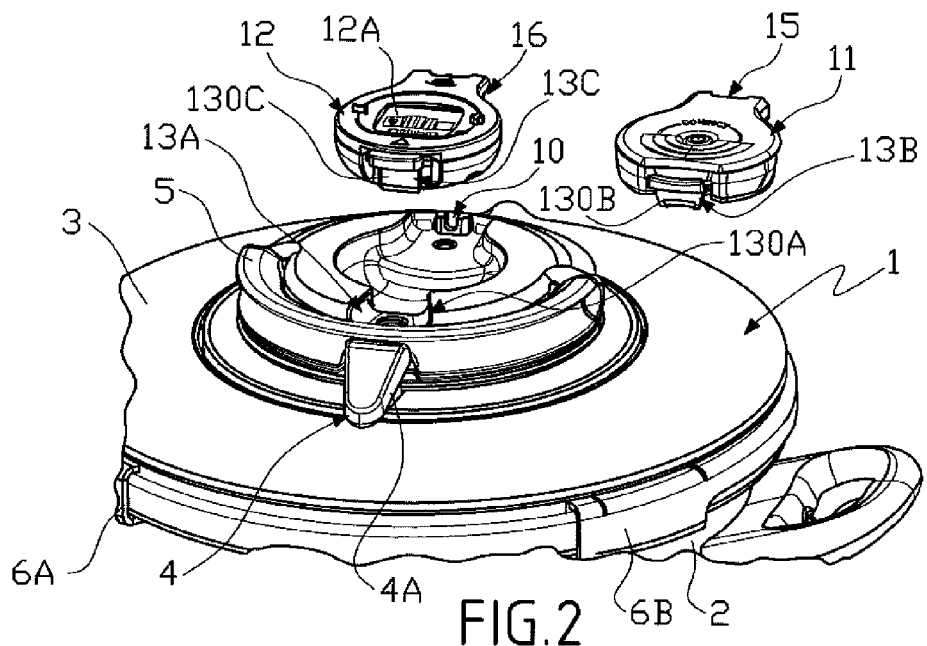
FIG. 2 shows an enlarged detail of FIG. 1.
Figure 3:
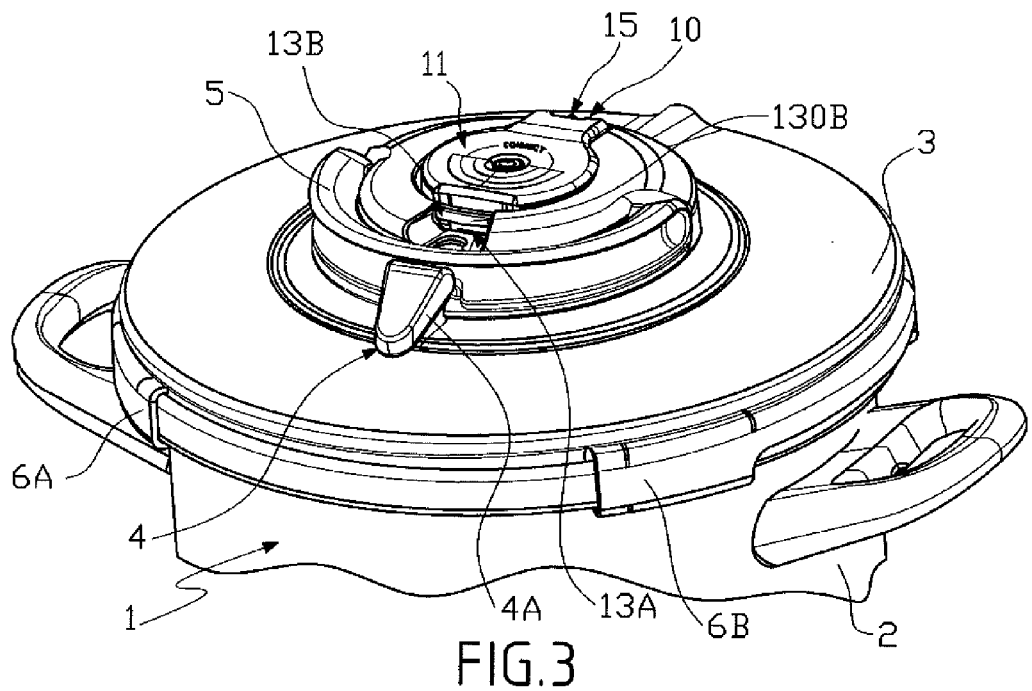
FIG. 3 shows the pressure cooker of FIGS. 1 and 2 with the telecommunications module of FIGS. 1 and 2 fastened to said pressure cooker.
Figure 4:
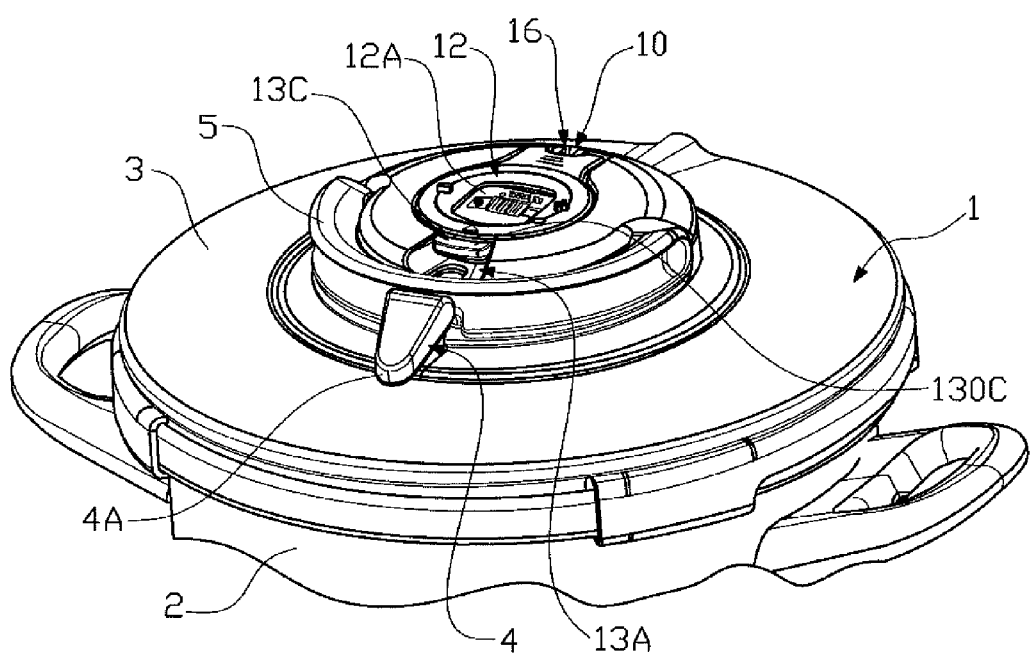
FIG. 4 is a view substantially similar to the FIG. 3 view, except that it is the timer module that is fastened to the pressure cooker in place of the telecommunications module.

The lid 3 is designed to be locked/unlocked at will relative to the vessel 2, locking the lid 3 enabling pressure to build up in the enclosure without the lid 3 coming off under the effect of the pressure inside the pressure cooker. To this end, the pressure cooker 1 includes locking/unlocking means for locking/unlocking the lid 3 on the vessel 2, which means may, in this example, be of any type known to the person skilled in the art (locking system having a locking bar, bayonet fittings, jaws, segments, etc.). The locking/unlocking means may, in conventional manner, be suitable for going between a locking configuration for locking the lid 3 relative to the vessel 2, in which configuration the lid 3 is secured to the vessel 2 in such a manner as to allow pressure to build up (configuration shown in FIG. 1), and an unlocking configuration (not shown) for unlocking the lid 3 relative to the vessel 2, in which configuration the lid 3 can be freely separated from the vessel 2 manually by the user.

As is well known per se, the pressure cooker 1 of the system of the invention includes a pressure regulator valve, which is preferably mounted on the lid 3 (and even incorporated therein), and is designed to maintain the pressure prevailing in the pressure cooker 1 (i.e. in the cooking enclosure formed by the association of the vessel 2 and of the lid 3) substantially at a setpoint value, commonly referred to as the "operating pressure" or "regulation pressure", and, for example, exceeding atmospheric pressure by a value lying in the range 4 kPa to 150 kPa, and preferably lying in the range 15 kPa to 150 kPa.

The regulator valve is advantageously designed to be sensitive to the pressure prevailing in the cooking enclosure, and to be mounted to move between at least a first position in which it shuts off communication from the enclosure to the outside so long as the internal pressure is less than or equal to a predetermined pressure $P_0$ corresponding to the setpoint value, and a second position in which it puts the inside of the enclosure into communication with the outside as soon as the internal pressure significantly exceeds the predetermined pressure $P_0$. The regulator valve thus makes it possible to maintain the pressure at a predetermined threshold $P_0$ (that corresponds to the setpoint value), beyond which value the valve allows steam to leak, thereby regulating the internal pressure of the pressure cooker. The regulator valve may be of any type known to the person skilled in the art, and, for example, be formed by a valve having a weight or a compression spring and mounted to move on the lid. Said regulator valve can take up a sealing low position (shut-off position) into which it is urged to return under the effect of its own weight (or under the effect of the return force exerted by the compression spring) onto a seat provided through a hole that is itself provided through the lid 3. The valve may also be pushed away into a high position under the effect of the internal pressure prevailing inside the pressure cooker, when said pressure exceeds the predetermined operating value $P_0$. In this position, the valve rises and opens up the orifice provided through the lid and via which the steam can escape to the outside.

Advantageously, the pressure cooker 1 includes a steam escape duct 10 via which said regulator valve allows steam to escape from the pressure cooker 1 as soon as the pressure prevailing in the pressure cooker exceeds said setpoint value. To this end, the duct 10 is advantageously mounted downstream from the regulator valve relative to the direction in which the steam escapes so that said valve is interposed between the hole provided through the lid 3 and the escape duct. Thus, when the pressure prevailing in the pressure cooker 1 exceeds the setpoint value, the valve rises (against its own weight and/or against the return force exerted by any compression spring), and opens up the hole provided through the lid 3, through which hole the steam can escape so as then to follow the escape duct 10 that channels it to the outside of the pressure cooker 1.

As is well known per se to the person skilled in the art, the pressure regulator valve may advantageously be a calibrated valve having adjustable calibration, enabling the user to select a predetermined setpoint value (operating pressure $P_0$) from among a choice of a plurality of predetermined values as a function of the type of food present in the pressure cooker. Preferably, the regulator valve is thus equipped with a calibration system formed by a compression spring that exerts a return force on the valve for urging it back into the shut-off position, the magnitude of which force may vary, and may be adjusted by compressing the spring to different extents as is well known per se.

The pressure cooker 1 of the system of the invention is also provided with at least one manual control member 4 mounted to move between a plurality of positions corresponding respectively to a plurality of operating states of said pressure cooker 1. In other words, the manual control member 4 enables the user to control one or more of the functions of the pressure cooker 1, such as, by way of purely illustrative and non-limiting example, decompression of the cooking enclosure and/or adjustment of the operating pressure level and/or locking/unlocking of the lid 3 relative to the vessel 2, etc.

In the example shown in the figures, the pressure cooker 1 is provided with a plurality of manual control members, including, in particular, a manual control member 4 making it possible for the user to control manually both decompression of the pressure cooker 1 and also adjustment of the operating pressure level. The locking/unlocking of the lid 3 relative to the vessel 2 is controlled by another manual control member 5, formed, in this example, by a rotary ring designed to control the radial movement of locking jaws 6A, 6B relative to the lid 3.

Each of the predetermined positions that can be taken up by the manual control member 4 is associated with a respective one of identification markings 7, 8, 9 (cf. FIG. 1) positioned on the pressure cooker 1, e.g. on the surface of the lid 3 (in such a manner as to be clearly visible to the user) in a predetermined layout. The identification markings 7, 8, 9 are designed to enable the user to identify, directly or indirectly, which function is associated with which position of the manual control member 4. For example, in the embodiment of FIG. 1, a first identification marking 7 corresponds to decompression of the utensil, while second and third identification markings 8, 9 correspond to respective ones of two different operating pressure levels (setpoint values). Each identification marking 7, 8, 9 is advantageously constituted by a pictogram that symbolizes the function associated with the position in question of the manual control member 4. In order to enable the pressure cooker 1 to be used easily and intuitively, the positions that can be taken up by the manual control member 4 are predetermined positions spaced apart by a constant distance and/or angular sector. The corresponding respective identification markings 7, 8, 9 are advantageously disposed in fixed manner on the pressure cooker 1, and preferably on the surface of the lid 3, i.e. the positions of said identification markings 7, 8, 9 are stationary relative to the lid 3. Conversely, the manual control member 4 is advantageously incorporated in the lid 3 while being mounted to move relative to the lid between the various different above-mentioned positions.

The manual control member 4 advantageously includes a graspable member serving to be shifted manually by the user between the various different above-mentioned positions, and a pointer member that points towards the identification marking corresponding to the instantaneous predetermined position in which the manual control member 4 finds itself. For example, the manual control member 4 comprises a cursor 4A that forms both a graspable member and a pointer member, said cursor 4A being, for example, mounted to turn about a central vertical axis (corresponding to the axis of revolution of the vessel 2).

As mentioned above, said manual control member 4 is advantageously designed to adjust said calibration, so that at least two of said positions of the manual control member 4 correspond to respective ones of two different calibrations, i.e. to respective ones of two different predetermined setpoint values. In a preferred embodiment, the manual control member 4 is thus designed to cause a spring that calibrates the regulator valve to compress to various extents, thereby adjusting the setpoint value.

In the advantageous embodiment shown in the figures, and as already mentioned above, the pressure cooker 1 includes an activatable decompression device that is designed to cause the pressure prevailing in the pressure cooker 1 to drop when it is activated. Preferably, said decompression device is designed to be suitable for being activated regardless of the pressure level prevailing in the enclosure, in order to put the inside of the enclosure into communication with the outside, and in order to enable steam to escape, thereby causing the pressure in the enclosure to decrease to a level allowing the lid 3 to be unlocked relative to the vessel 2 without any risk for the user. For example, the activatable decompression device is implemented by means of the pressure regulator valve that may, for example, be designed either to be placed in a leakage position corresponding to the decompression device being activated, or to have its calibration adjusted to a very low setpoint value that makes it possible to cause the pressure prevailing in the enclosure to drop considerably.

Preferably, the manual control member 4 is designed to cause the decompression device to be activated.

Thus, in the preferred embodiment shown in the figures, the manual control member 4 is designed firstly to cause the decompression device to be activated, when it is in the position corresponding to the first identification marking 7, and secondly to cause the calibration of the regulator valve to be adjusted to different setpoint values corresponding respectively to the second and third identification markings 8, 9.

In accordance with the invention, the household food-cooking system includes an independent telecommunications module 11 and an independent timer module 12. In other words, each of said modules, namely the telecommunications module 11 and the timer module 12, forms a unit that is distinct from the pressure cooker 1, and that is preferably of the "handheld" or "mobile" type, i.e. each of said units corresponding to a respective module, namely the telecommunications module 11 or the timer module 12, can be held by or in the hand by the user. The telecommunications module 11 is distinct and independent form the timer module 12. However, this does not preclude the telecommunications module 11 being formed from the timer module 12 or vice versa. For example, the telecommunications module 11 may be formed by assembling together the timer module 12 and a complementary electronic unit serving to be connected removably to the timer module 12, in such a manner as to transform the timer module 12 into a new one-piece subassembly constituting the telecommunications module 11. Conversely, the timer module 12 may be formed by associating the telecommunications module 11 and a complementary electronic unit (optionally including a display screen) serving to be connected removably to the telecommunications module 11 to form a new independent unit constituting the timing module 12.

In accordance with the invention, said pressure cooker 1, said telecommunications module 11, and said timer module 12 are provided with complementary fastener means 13A, 13B, 13C making it possible to fasten either said telecommunications module 11 or said timer module 12 to said pressure cooker 1 as alternatives and in removable manner.

In other words, the telecommunications module 11 and the timer module 12 are designed to be fastenable in turn to the pressure cooker 1, advantageously at the same place serving to receive equally well the telecommunications module 11 or the timer module 12 (but preferably not both at the same time). This means that the fastener means 13A with which the pressure cooker 1 is provided are designed to interact with the complementary fastener means 13B with which the telecommunications module 11 is provided, in order to secure said telecommunications module 11 removably to the pressure cooker 1, in such a manner that the pressure cooker 1 and the telecommunications module 11 then form a one-piece subassembly. In the same way, the fastener means 13A with which the pressure cooker 1 is provided are designed to co-operate with the complementary fastener means 13C with which the timer module 12 is provided in order to secure the timer module 12 removably to the pressure cooker 1, so that the pressure cooker 1 and the timer module 12 form a one-piece subassembly. Naturally, the uniting of the telecommunications module 11 with the pressure cooker 1, and the uniting of the timer module 12 with the pressure cooker 1 are fully reversible, enabling the user, at the user's discretion, to fasten either the telecommunications module 11 or the timer module 12 to the pressure cooker 1 and to unfasten either of those modules from the pressure cooker 1 at will (and preferably purely manually without using any tool).

The telecommunications module 11 and the timer module 12 are thus of the interchangeable type, because the user may, at any time, fasten either of said modules to the pressure cooker 1, as a function of the circumstances and the desired mode of use of the pressure cooker 1, as appears in more detail below. Preferably, in accordance with the embodiment shown in the figures, the pressure cooker 1 thus has a single fastener means 13A capable of co-operating (preferably not simultaneously) both with the complementary fastener means 13B equipping the telecommunications module 11, and with the complementary fastener means 13C equipping the timer module 12.

In accordance with the invention, the telecommunications module 11 is capable, when it is fastened to said pressure cooker 1, of transmitting at least one signal relating to operation of said pressure cooker 1 to an independent computer terminal, via a wireless link. In other words, when the telecommunications module 11 is fastened, via the above-mentioned complementary fastener means 13A, 13B to said pressure cooker 1, a functional link is set up between the telecommunications module 11 and the pressure cooker 1, enabling the telecommunications module 11 to transmit, via a non-physical link, a signal relating to operation of the pressure cooker 1 to a computer terminal that is distinct from the pressure cooker 1.

The wireless link is, for example, a link implementing electromagnetic waves, and preferably radio waves, infrared waves, or some other waves, allowing (without any physical link of the wire or cable type) analog and/or digital data to be transferred between the telecommunications module 11 and the above-mentioned remote terminal. Preferably, the wireless link is a Bluetooth® link based particularly advantageously on the "Bluetooth 4.0, Bluetooth Low Energy®" protocol. Naturally, this means that when, both the telecommunications module 11 and the above-mentioned independent computer terminal are equipped with Bluetooth® technology to enable both-way communications to be set up between them. The computer terminal 11 in question, which is advantageously part of the system of the invention, is totally independent of the pressure cooker 1, and is advantageously of the portable or "mobile" type, i.e. it is preferably designed to be suitable for being carried and manipulated with one or both hands by the user. Advantageously, the computer terminal in question is constituted by a smartphone, a touch-sensitive tablet (of the Apple iPad® type), or a laptop computer, each of which is preferably equipped with Bluetooth® technology, as described above. Advantageously, the above-mentioned computer terminal is provided with a display screen, in such a manner as to be suitable for running a graphical user interface (GUI) for giving assistance with using the pressure cooker 1. The GUI 10 is thus preferably run as one (or more) pieces of software installed on the computer terminal, to produce, on the screen of the computer terminal, written or graphical information, in order to guide the user in using the pressure cooker 1, preferably in real time, in the manner of a virtual coach. The GUI in question is advantageously of the interactive type, which is made possible by means of the telecommunications module 11 transmitting said signal relating to operation of the pressure cooker 1. The independent computer terminal can then receive the signal relating to operation of the pressure cooker 1 and coming from the telecommunications module 11 fastened to the pressure cooker 1, in such a manner as to process said signal so as to display, for the attention of the user, information and data that might help the user to use the pressure cooker 1 optimally. The use of an independent computer terminal naturally enables advantageous use to be made of all of the features specific to said computer terminal, in particular as regards display and computation capacity, in order to deliver to the user information that is particularly rich, intuitive, ergonomic, and detailed.

In a particularly advantageous embodiment, the telecommunications module 11 thus makes it possible to set up a wireless functional link between a pressure cooker 1 and a commercially available external communicating computer tool (smartphone, tablet, etc.), on which software is run that, in particular, generates a graphical user interface (GUI) for giving assistance with use.

The timer module 12 is, when it is fastened to the pressure cooker 1, capable of counting down a predetermined time to be counted from the instant at which the pressure prevailing in the pressure cooker 1 substantially reaches the setpoint value for the first time. The timer module 12 is thus designed to detect the setpoint value being reached and to respond by triggering a timer that counts down a predetermined time, which time corresponds, in this example, to a desired cooking time for cooking food at the operating pressure. The predetermined time is advantageously programmable by the user, e.g. by programming means (of the following type: buttons, touch-sensitive screen, or some other type) with which the timer module 12 is provided. Thus, the user may, as a function of circumstances (and in particular as a function of whether or not the user has a computer terminal of the touch-sensitive tablet or smartphone types) choose to fasten to the pressure cooker 1:

either the telecommunications module 11 so as to benefit from particularly extensive assistance with use via the independent computer terminal in the user's possession;

or the timer module 12, in order to give preference to purely stand-alone operation, which does not require an independent computer terminal to be used, but which does, nevertheless, make it possible to count down an (advantageously programmable) predetermined time that is to be counted from the instant (detected automatically by the timer module 12) at which the pressure in the pressure cooker reaches the setpoint value.

Advantageously, said fastener means 13A, 13B, 13C comprise a first connector 130B incorporated in the telecommunications module 11, a second connector 130C incorporated in the timer module 12, and a connection port 130A incorporated in the pressure cooker 1, said connection port 130A being designed to interact interchangeably with the first connector 130B and with the second connector 130C so as to couple the connection port 130A mechanically and functionally respectively to the first connector 130B or to the second connector 130C. Thus, the first connector 130B co-operating with the connection port 130A mechanically and functionally connects the telecommunications module 11 to the pressure cooker 1, while the second connector 130C co-operating with the same connection port 130A mechanically and functionally connects the timer module 12 to the pressure cooker 1. The term "functionally connects" or "functional connection" are used herein to designate a connection making it possible at least:

for the telecommunications module 11 to transmit said signal representative of operation of the pressure cooker 1; and for the timer module 12 to detect the instant at which the pressure prevailing in the pressure cooker reaches the setpoint value for the first time, in order to respond by counting down said predetermined time.

Advantageously, the connection port 130A is incorporated in the lid 3 of the pressure cooker 1. For example, as shown in the figures, the connection port 130A is in the form of a recess provided in the surface of the lid 3, on the outside face thereof, each of said modules, namely the telecommunications module 11 and the timer module 12, is of shape substantially complementary to the shape of said recess, so that said recess can receive the telecommunications module 11 and the timer module 12 in turn. Thus, in this particularly advantageous embodiment, the connection port 130A is constituted by a concave shape that is located in recessed manner on the lid 3 and that serves for receiving, as alternatives and at the user's discretion, the telecommunications module 11 and the timer module 12.

Advantageously, the pressure cooker 1 includes a control deck 14 mounted on the lid 3, and more precisely on the outside surface of said lid, as shown in the figures. The deck 14 is mounted either permanently or removably on the lid 3. The deck 14 forms a one-piece subassembly that advantageously incorporates the main control and regulation members of the pressure cooker 1, and in particular the control member 4 for controlling the calibration and the decompression, the control member 5 for controlling the locking/unlocking, the pressure regulator valve, and the steam escape valve 10 that is associated with said regulator valve, any overpressure safety valve, any opening safety member, and the recess forming the connection port 130A.

Advantageously, each of said first and second connectors 130B, 130C is formed by a resilient fastener designed to take up at least one active configuration when the telecommunications module 11 or the timer module 12, is mounted in the recess forming the connection port 130A, for the purpose of exerting a force on a complementary shape of said recess, by deforming on coupling, which force holds the connection port 130A and the corresponding module (telecommunications module 11 or timer module 12) stationary. In other words, each of the resilient fasteners respectively forming the first connector 130B and the second connector 130C is designed to be capable of deforming when it interacts with the connection port 130A, this interaction, so long as it exists, generating deformation of the resilient fastener in question. In reaction, by resilient return, this deformation generates a force tending to hold the module in question stationary relative to the pressure cooker 1. Each of said modules, namely the telecommunications module 11 and the timer module 12, is thus advantageously designed to be coupled to the pressure cooker 1 by snap-fastening. Unfastening can be obtained manually, by using one or two fingers (without any tool) to exert an uncoupling force on the connector in question (first connector 130B or second connector 130C) so as to overcome the resilient return force and thereby extract the module in question from the recess. Such a mechanical coupling system is particularly easy to manufacture and to use, while also being robust and reliable. Such a fastener system may, in addition, be made entirely of plastics materials, thereby facilitating manufacturing the system and limiting the cost of manufacturing it.

Advantageously, the telecommunications module 11 includes a first detector 15 that, when said telecommunications module 11 is fastened to said pressure cooker 1, by interlocking of the complementary fastener means 13A, 13B, is capable of producing a first signal that is representative of the pressure and/or of the temperature prevailing in the pressure cooker 1, said first signal forming, or being included in, and/or making it possible to obtain said signal relating to operation of said pressure cooker 1. Preferably, the first detector 15 comprises a first temperature sensor 15A designed to be disposed in and/or in the vicinity of the steam escape duct 10 when said telecommunications duct 11 is fastened to said pressure cooker 1, in order to enable said temperature sensor 15A to sense the increase in temperature resulting from steam escaping through the duct 10, which takes place when the pressure prevailing in the pressure cooker 1 exceeds the setpoint value.

In the same way, the timer module 12 advantageously includes a second detector 16 that, when said timer module 12 is fastened to said pressure cooker 1, is capable of producing a second signal representative of the pressure and/or of the temperature prevailing in the pressure cooker 1, and on the basis of which said timer module 12 is designed to determine said instant at which the pressure prevailing in the pressure cooker 1 has substantially reached said setpoint value for the first time.

In an advantageous embodiment, the second detector 16 comprises a second temperature sensor 16A designed to be disposed in and/or in the vicinity of the steam escape duct 10 when said timer duct 12 is fastened to said pressure cooker 1, in order to enable said second temperature sensor 16A to sense the increase in temperature resulting from steam escaping through the duct 10, when the regulator valve allows steam to escape via the duct 10 whenever the pressure prevailing in the pressure cooker 10 exceeds the setpoint value.

Preferably, each of said first and second detectors 15, 16 mentioned above is advantageously designed to operate on the principle described in Document EP 1 458 268, the contents of which are incorporated herein by way of reference. For example, one or each of the first and second temperature sensors includes a thermocouple probe capable of delivering an electrical signal representative of temperature.

Each of said temperature sensors 15A, 16A is advantageously disposed at a corresponding end of the module 11, 12, so that, when said module 11, 12 is fastened to the pressure cooker 1, the associated temperature sensor 15A, 16A is disposed at the outlet of the escape duct 10, in the path of the flow of steam, so as to sense the rise in temperature associated with appearance of a first flow of steam in the duct 10, indicating that the pressure setpoint value has been reached. Other modes of operation are then possible, as a function of the type of the module (telecommunications module 11 or timer module 12) that is fastened to the pressure cooker. When the telecommunications module 11 is fastened to the pressure cooker, the electrical signal representative of the temperature sensed by the first sensor 15A is processed by the telecommunications module 11 (which, for example, incorporates a microcontroller for that purpose) so as to detect the instant at which the pressure setpoint value is reached in the pressure cooker 1. The telecommunications module 11 then sends this information to the remote computer terminal so that the GUI run by said computer terminal can use said information, e.g. for triggering counting-down of a predetermined cooking time. Alternatively, it is possible for the temperature signal produced by the first temperature sensor 15A to be sent "raw" (without any digital or analog processing) by the telecommunications module 11 to the remote terminal, which analyzes the signal to determine the instant at which the pressure setpoint value is reached. In this situation, the temperature signal is sent continuously or at regular intervals by the telecommunications module 11 to the remote terminal, so that said remote terminal can determine the instant corresponding to the rise in temperature resulting from the setpoint pressure value being reached.

If the user has chosen to fasten the pressure cooker 1 to the timer module 12 rather than to the transmitter module 11, said computer terminal is capable of determining, by means of the second temperature sensor 16A, the instant at which the pressure setpoint value is reached for the first time. The timer module 12 is then, by itself, capable of counting down said predetermined time automatically as from the instant at which the setpoint value has been reached.

The user can thus either opt for a "local" use mode, in which the temperature signal is processed fully by the timer module 12 that counts down the predetermined pressure-cooking time by itself, or for a "remote" mode in which the telecommunications module 11 communicates the temperature signal via a wireless link to the remote terminal, which advantageously counts down the predetermined time, preferably in the context of said terminal running a graphical user interface (GUI) for giving assistance with use.

In both cases, the system is advantageously designed to display the counting-down of the predetermined time so that the user can readily and continuously access the time remaining for the pressure cooking. To this end, the timer module 12 includes a display screen 12A displaying at least said counting-down of the predetermined time. When it is the telecommunications module 11 that is used with the pressure cooker 1, the counting-down of the predetermined pressure-cooking time is displayed by the screen with which the independent computer terminal is advantageously provided, which terminal receives the signal transmitted by the telecommunications module 11 in response to the sudden rise in temperature detected by the first temperature sensor 15A. Preferably, the telecommunications module is not provided with a display screen, unlike the timer module 12.

Advantageously, the telecommunications module 11 includes a third detector (not shown in the figures) that is capable, when the telecommunications module 11 is fastened to the pressure cooker 1 (i.e. in this example, received by the connection port 130A), of producing a third signal that is representative of the position taken up by the manual control member 4, said third signal forming, or being included in, and/or making it possible to obtain said signal relating to operation of said pressure cooker 1.

By means of this technically advantageous provision, the software for giving assistance with use that is run by the independent computer terminal can continuously know the real position of the manual control member 4, and can adapt the information and data supplied to the user accordingly so as to help the user use the pressure cooker 1 optimally.

Thus, the third detector advantageously generates an electrical signal representative of the instantaneous position of the control member 4. This electrical signal is transmitted, preferably immediately, by the telecommunications module 11, to the remote computer terminal, in such a manner that said signal is processed by the GUI run by said terminal. This processing may, for example, consist in controlling the position of a virtual pointer displayed by the screen of the terminal, so that the position of said virtual pointer indicates, in real time, the instantaneous position of the manual control member 4.

The third detector may be of any type known to the person skilled in the art. For example, the third detector includes a first plurality of magneto-resistive sensors, while the manual control member 4 incorporates a first magnetic activator designed to excite one or more of said magneto-resistive sensors selectively and remotely as a function of the position of the manual control member 4, in such a manner as thereby to code said position of said control member, as in the teaching of Document WO2010/081994, the contents of which are incorporated herein by way of reference. Preferably, the telecommunications module 11 thus incorporates a series of magneto-resistive sensors (e.g. manufactured using complementary metal-oxide-semiconductor (CMOS) technology) disposed at regular intervals, on a circular arc, while the manual control member 4, which advantageously shifts in rotation, incorporates a magnet capable of selectively exciting one or more of said magneto-resistive sensors as explained above.

In a particularly advantageous embodiment (which corresponds to the embodiment shown in the figures), the telecommunications module 11 is thus capable of transmitting to the independent computer terminal:

the above-mentioned first signal, which is representative of the pressure and/or of the temperature prevailing in the pressure cooker 1, and that is obtained by means of the first temperature sensor 15A; and the above-mentioned third signal, which is representative of the position taken up by the manual control member 4 and which is obtained by means of the combination of the magneto-resistive sensors incorporated in the telecommunications module 11 and of the excitation magnet incorporated in the manual control member 4.

The above-mentioned "signal relating to operation" of the pressure cooker 1 is thus, in this situation, made up of a plurality of signals that are transmitted at various instants to the independent computer terminal by the telecommunications module 11. The GUI that is advantageously run by the remote terminal is thus, by means of the information coming from said first signal and from said third signal, capable of continuously informing the user in particularly simple and ergonomic manner on the instantaneous operating state of the pressure cooker 1, or indeed of responding by controlling said pressure cooker.

Advantageously, the timer module 12 also includes a fourth detector that, when the timer module 12 is fastened to the pressure cooker 1, is capable of producing a fourth signal that is representative of the position of the manual control member 4, on the basis of which signal said timer module 12 displays, on said display screen 12A, information representative of the position taken up by said manual control member 4. Advantageously, the fourth detector includes a second plurality of magneto-resistive sensors, while the manual control member 4 incorporates a second magnetic activator designed to excite one or more of said magneto-resistive sensors selectively and remotely as a function of the position of the manual control member 4, in such a manner as thereby to code said position. In this advantageous embodiment, the structure and operation of the fourth detector are substantially identical to the structure and operation of the third detector mentioned with reference to the telecommunications module 11.

Advantageously, said first and second magnetic activators are constituted by a single common activator, i.e. the manual control member 4 incorporates a single common magnetic activator (e.g. a permanent magnet) capable of co-operating either with the first plurality of magneto-resistive sensors (if the telecommunications module 11 is fastened to the pressure cooker 1) or with the second plurality of magneto-resistive sensors (if the timer module 12 is fastened to the pressure cooker 1) to code the instantaneous position of the manual control member 4, and to enable the module in question to produce a signal representative of said position, said signal being designed to be used either locally (by the timer module 12 to display on its screen 12A information of the pictogram type or of some other type, representative of the position taken up by the manual control member 4), or remotely (the position information being transmitted by wireless link to the remote terminal that then uses it, for example, to display, on the screen of the computer terminal, information representative of the position taken up by the manual control member 4).

To sum up, in the particularly advantageous embodiment shown in the figures, the telecommunications module 11 and the timer module 12 are both capable of producing:

a signal representative of the pressure and/or of the temperature (it being understood that the pressure in the pressure cooker depends on the temperature prevailing in the pressure cooker, and vice versa); and a signal representative of the position of the manual control member 4.

The essential difference between the two modules 11, 12 lies in the fact that the timer module 12 processes the information resulting from the above-mentioned signals directly by itself, e.g. in such a manner as to display, on the screen 12A with which it is provided, information relating, for example, to the counting-down of the predetermined pressure-cooking time and to the position taken up by the manual control member 4, whereas the telecommunications module 11 is capable of transmitting to a remote terminal information relating to the setpoint value being reached and to the position of the manual control member 4, so that this information can be processed by software for giving assistance with use.

However, it is quite possible for either one of these modules, namely the telecommunications module 11 and the timer module 12, not to use all of the above-mentioned sensors. The terms "first", "second", "third", and "fourth" are therefore used above only to identify the described elements (detectors, sensors, signals, etc.) unambiguously. This means, for example, that it is quite possible for the system to having only the above-mentioned second detector 16 but not the first detector 15, or vice versa.

The invention also relates, per se, to the telecommunications module 11 of the above-described system. Said telecommunications module 11 thus serves to be part of a household food-cooking system that, as described above, further comprises:

- a pressure cooker 1 that is provided firstly with a pressure regulator valve designed to maintain the pressure prevailing in the pressure cooker 1 substantially at a setpoint value, and secondly with fastener means 13A; and
- a timer module 12 independent from said telecommunications module 11, said timer module 12 being provided with fastener means 13C complementary to the fastener means 13A with which the pressure cooker 1 is provided so as to fasten said timer module 12 removably to the pressure cooker 1, which timer module, when it is fastened to said pressure cooker 1, is capable of counting down a predetermined time to be counted from the instant at which the pressure prevailing in the pressure cooker 1 substantially reaches said setpoint value for the first time.

As described above, said telecommunications module 11 is also provided with fastener means 13B that are complementary to said fastener means 13A with which the pressure cooker 1 is provided, so as to fasten said telecommunications module 11 removably to the pressure cooker 1 in place of said timer module 12. As described above, the telecommunications module 11 is capable, when it is fastened to said pressure cooker 1, of transmitting at least one signal relating to operation of said pressure cooker 1 to an independent computer terminal, via a wireless link.

Preferably, the telecommunications module 11 is at least equipped with a radio transmitter, and preferably with a Bluetooth® transmitter system. In particularly preferable manner, as explained above, the telecommunications module 11 incorporates not only a radio transmitter but also a temperature sensor 15A and a position sensor, or position sensor elements, such as, for example, magneto-resistive sensors.

The invention finally relates per se to a household method of cooking food by means of a pressure cooker 1, which method is preferably implemented by means of the system described above.

The entire description above therefore applies completely, mutatis mutandis, to the household cooking method of the invention. The present invention also relates to a household method of cooking food by means of a pressure cooker 1 provided with a pressure regulator valve designed to maintain the pressure prevailing in the pressure cooker 1 substantially at a setpoint value.

The method in question includes a step in which an independent telecommunications module 11 and an independent timer module 12 are, in turn, fastened removably to the pressure cooker 1, said telecommunications module 11 being capable, when it is fastened to the pressure cooker 1, of transmitting at least one signal relating to operating of said pressure cooker 1 to an independent computer terminal via a wireless link, while the timer module 12 is capable, when it is fastened to the pressure cooker 1, of counting down a predetermined time to be counted from the instant at which the pressure prevailing in the pressure cooker 1 substantially reaches said setpoint value for the first time.

The invention thus enables a user of a pressure cooker 1 to opt either for a totally stand-alone operating mode with reduced assistance (this mode taking place via the timer module 12) or a remote advanced assistance mode that takes place via the telecommunications module 11, the pressure cooker 1 being provided with a single port designed to receive equally well either of said modules 11, 12, both of which are advantageously in the user's possession so as to allow the user the choice of the mode of use of the pressure cooker 1. The single port in question thus makes it possible to set up a connection that is both mechanical (interlocking) and functional either with the telecommunications module 11 or with the timer module 12.

The invention claimed is:

1. A household food-cooking system comprising:
   - a pressure cooker provided with a pressure regulator valve designed to maintain the pressure prevailing in the pressure cooker at a setpoint value and a connection port;
   - a telecommunications module having a transmitter and a first connector; and
   - a timer module having a timer and a second connector,
   - wherein the telecommunications module, the timer module, and the pressure cooker are physically separate from each other;
   - wherein the connection port of the pressure cooker is designed to interchangeably connect with the first connector of the telecommunications module, and the second connector of the timer module, and wherein the connection port of the pressure cooker is designed to enable the telecommunications module and the timer module to be fastened to the pressure cooker as alternatives and in a removable manner,
   - the telecommunications module being capable, when fastened to the pressure cooker, of transmitting via the transmitter at least one signal relating to operation of the pressure cooker to an independent computer terminal, and
   - the timer module being capable, when fastened to the pressure cooker, of counting down via the timer a predetermined time, wherein the predetermined time is counted from the instant at which the pressure prevailing in the pressure cooker reaches the setpoint value for the first time.

2. The system according to claim 1, the connection port being designed to couple the connection port mechanically and functionally respectively to the first connector and to the second connector.

3. The system according to claim 2, wherein the pressure cooker comprises a vessel and a lid that serves to be associated with the vessel to form a cooking enclosure inside which the pressure can reach the setpoint value, the connection port being incorporated in the lid.

4. The system according to claim 3 wherein the connection port is in the form of a recess provided in the surface of the lid, the telecommunication module and the timer module each having a shape-complementary to the shape of the recess, so that the recess can receive, in turn, the telecommunications module and the timer module.

5. The system according to claim 1, wherein the pressure cooker includes a steam escape duct, via which the regulator valve allows steam to escape whenever the pressure prevailing in the pressure cooker exceeds the setpoint value.

6. The system according to claim 5, wherein the telecommunications module includes a first detector that, when the telecommunications module is fastened to the pressure cooker, is capable of producing a first signal that is representative of the pressure or of the temperature prevailing in the pressure cooker, the first signal forming, being included in, or making possible to obtain the at least one signal relating to operation of the pressure cooker.

7. The system according to claim 6, wherein the first detector comprises a first temperature sensor designed to be disposed in or in the vicinity of the steam escape duct when the telecommunications module is fastened to the pressure cooker, in order to enable the first temperature sensor to sense the increase in temperature resulting from the steam escaping through the duct.

8. The system according to claim 5, wherein the timer module includes a second detector that, when the timer module is fastened to the pressure cooker, is capable of producing a second signal representative of the pressure or of the temperature prevailing in the pressure cooker, and on the basis of which the timer module is designed to determine the instant at which the pressure prevailing in the pressure cooker-reaches the setpoint value for the first time.

9. The system according to claim 8, wherein the second detector comprises a second temperature sensor designed to be disposed in or in the vicinity of the steam escape duct when the timer module is fastened to the pressure cooker, in order to enable the second temperature sensor to sense the increase in temperature resulting from the steam escaping through the duct.

10. The system according to claim 1, wherein the pressure cooker is provided with at least one manual control member that is mounted to move between a plurality of positions corresponding respectively to a plurality of operating states of the pressure cooker.

11. The system according to claim 10, wherein the telecommunications module includes a third detector that, when the telecommunications module is fastened to the pressure cooker, is capable of producing a third signal representative of the position taken up by the manual control member, the third signal forming, being included in, making it possible to obtain the at least one signal relating to operation of the pressure cooker.

12. The system according to claim 11, wherein the third detector includes a first plurality of magneto-resistive sensors, while the manual control member incorporates a first magnetic activator designed to excite one or more of the magneto-resistive sensors selectively and remotely as a function of the position of the manual control member, in such a manner as thereby to code the position of the manual control member.

13. The system according to claim 10, wherein the timer module includes a display screen displaying at least the counting-down of the predetermined time.

14. The system according to claim 13, wherein the timer module includes a fourth detector that, when the timer module is fastened to the pressure cooker, is capable of producing a fourth signal that is representative of the position of the manual control member, on the basis of which signal the timer module displays, on the display screen, information representative of the position taken up by the manual control member.

15. The system according to claim 14, wherein the fourth detector includes a second plurality of magneto-resistive sensors, while the manual control member incorporates a second magnetic activator designed to excite one or more of the magneto-resistive sensors selectively and remotely as a function of the position of the manual control member, in such a manner as thereby to code the position.

16. The system according to claim 1, wherein the transmitter of the telecommunications module is able to communicate with the independent computer terminal via a wireless link.

17. A household food-cooking system comprising:
a pressure cooker having a pressure regulator valve designed to maintain a pressure prevailing in the pressure cooker at a setpoint value and a connection port disposed on the pressure cooker;
a timer module independent from the pressure cooker, the timer module having a connector and a timer, wherein the connector is complementary to the connection port of the pressure cooker and used to fasten the timer module removably to the pressure cooker, and, wherein the timer module, when fastened to the pressure cooker, is capable of counting down via the timer a predetermined time starting from the instant at which the pressure prevailing in the pressure cooker reaches the setpoint value for the first time; and
a telecommunications module independent from the timer module and the pressure cooker, wherein the telecommunications module, the timer module, and the pressure cooker are physically separate from each other, the telecommunications module having a transmitter and a first connector, wherein the first connector is complementary to the connection port of the pressure cooker and used to fasten the telecommunications module removably to the pressure cooker in place of the timer module, the telecommunications module being capable, when fastened to the pressure cooker, of transmitting via the transmitter at least one signal relating to operation of the pressure cooker to an independent computer terminal;
wherein the connection port of the pressure cooker is designed to interchangeably connect with the first connector of the telecommunications module, and the second connector of the timer module, and wherein the connection port of the pressure cooker is designed to enable the telecommunications module and the timer module to be fastened to the pressure cooker as alternatives and in a removable manner.

18. A method of cooking food by a pressure cooker having a pressure regulator valve designed to maintain the prevailing pressure in the pressure cooker at a setpoint value and a connection port disposed on a lid of the pressure cooker for removably fastening either a telecommunications module having a first connector or a timer module having a second connector to the pressure cooker, wherein both the telecommunications module and the timer module cannot be removably fastened to the pressure cooker at the same time, and wherein the telecommunications module and the timer module are physically distinct from each other and the pressure cooker, the method comprising the steps of:
removably fastening the telecommunications module to the pressure cooker by connecting the first connector with the connection port, wherein the telecommunications module is capable, when fastened to the pressure cooker, of transmitting at least one signal relating to operation of the pressure cooker to an independent computer terminal;

transmitting via a transmitter the at least one signal relating to the operation of the pressure cooker to the independent computer terminal;

removably fastening, instead of the telecommunications module, the timer module to the pressure cooker by connecting the second connector with the connection port, wherein the timer module is capable, when fastened to the pressure cooker, of counting down a predetermined time;

counting down the predetermined time starting from the instant at which the pressure in the pressure cooker reaches the setpoint value for the first time; and displaying the counting down of the predetermined time on a display screen on the timer module.

19. The system according to claim 1, further comprising:

at least one manual control member having a common magnetic activator, wherein the at least one manual control member is disposed on the pressure cooker and mounted to move between a plurality of positions corresponding respectively to a plurality of operating states of the pressure cooker;

a third detector disposed within the telecommunications module, wherein the third detector includes a first plurality of magneto-resistive sensors;

a fourth detector disposed within the timer module, wherein the fourth detector includes a second plurality of magneto-resistive sensors;

wherein the common magnetic activator is designed to excite the first plurality of magneto-resistive sensors, when the telecommunications module is fastened to the pressure cooker, or the second plurality of magneto-resistive sensors, when the timer module is fastened to the pressure cooker, to code the position of the manual control member and enable either the telecommunications module or the timer module to produce a signal representative of the position of the manual control member.

* * * * *